US009485699B2

(12) United States Patent
Goldhamer

(10) Patent No.: US 9,485,699 B2
(45) Date of Patent: Nov. 1, 2016

(54) OFFLOADING MOBILE APPLICATIONS TO BASE STATIONS

(71) Applicant: Mariana Goldhamer, Ramat Gan (IL)

(72) Inventor: Mariana Goldhamer, Ramat Gan (IL)

(*) Notice: Subject to any disclaimer, the term of this patent is extended or adjusted under 35 U.S.C. 154(b) by 258 days.

(21) Appl. No.: 14/222,634

(22) Filed: Mar. 23, 2014

(65) Prior Publication Data

US 2014/0287754 A1 Sep. 25, 2014

(30) Foreign Application Priority Data

Mar. 24, 2013 (IL) .......................................... 225455

(51) Int. Cl.
*H04W 4/00* (2009.01)
*H04W 36/22* (2009.01)
*H04W 36/00* (2009.01)

(52) U.S. Cl.
CPC ............. *H04W 36/22* (2013.01); *H04W 4/003* (2013.01); *H04W 36/0055* (2013.01); *H04W 4/001* (2013.01)

(58) Field of Classification Search
None
See application file for complete search history.

(56) References Cited

U.S. PATENT DOCUMENTS

| | | | | |
|---|---|---|---|---|
| 9,087,018 B2* | 7/2015 | Nandlall | | |
| 2010/0110874 A1* | 5/2010 | Kang | ................... | H04L 27/2602 370/208 |
| 2013/0142055 A1* | 6/2013 | Bao | .................... | H04W 36/0011 370/252 |
| 2013/0237233 A1* | 9/2013 | Radulescu | ............ | H04W 36/22 455/440 |
| 2014/0045485 A1* | 2/2014 | Jain | ................... | H04W 52/0261 455/420 |

OTHER PUBLICATIONS

IEEE Std 802.11™-2012, Part 11: Wireless LAN Medium Access Control (MAC) and Physical Layer (PHY) Specifications.
IEEE Std 802.15.4™-2003, Part 15.4: Wireless Medium Access Control (MAC) and Physical Layer (PHY) Specifications for Low-Rate Wireless Personal Area Networks (LR-WPANs).
IEEE Std 802.16™-2012, IEEE Standard for Air Interface for Broadband Wireless Access Systems.
3GPP TS 36.211 V11.1.0 (Dec. 2012), Technical Specification Group Radio Access Network; Evolved Universal Terrestrial Radio Access (E-UTRA);Physical Channels and Modulation.
3GPP TS 36.213 V11.1.0 (Dec. 2012), TSG Radio Access Network;Evolved Universal Terrestrial Radio Access (E-UTRA); Physical layer procedures (Release 11).
3GPP TS 36.321 V11.1.0 (Dec. 2012), TSG Radio Access Network; E-UTRA; Medium Access Control (MAC) protocol specification (Release 11), clause 6.2.1.
3GPP TS 36.423 V11.3.0 (Dec. 2012), TSG Radio Access Network; Evolved Universal Terrestrial Radio Access Network (E-UTRAN); X2 application protocol (X2AP) (Release 11).
Recommendation ITU-R M.1457-10, (Jun. 2011), Detailed specifications of the terrestrial radio interfaces of International Mobile Telecommunications-2000 (IMT-2000).
3GPP TS 36.331 V11.1.0 (Dec. 2012), TSG Radio Access Network; E-UTRAN; Radio Resource Control (RRC);Protocol specification (Release 11), clause 4.2.2.

* cited by examiner

*Primary Examiner* — Kenny Lin

(57) ABSTRACT

A method for mobile computing includes configuring a group of two or more base stations in a vicinity of a user equipment (UE) in a cellular communication network to serve as a femtocloud in support of application programs running on the UE. A femtocloud control program runs on a platform associated with the network. In response to a request from the UE, an application program is offloaded from the UE for execution by one or more of the base stations in the femtocloud under control of the femtocloud control program. Upon handing over radio communication with the UE from a first base station to a second base station, the execution of the offloaded application is also handed over among the base stations.

15 Claims, 4 Drawing Sheets

OFFLOADING MOBILE APPLICATIONS TO BASE STATIONS

FIELD OF THE INVENTION

The invention relates generally to digital communication systems and in particular to offloading of applications running on a wireless user device.

BACKGROUND OF THE INVENTION

Future mobile applications will be more and more demanding of computing and memory resources and also will require more bandwidth for communication and shorter computation delays. An example of such an application is video recognition. At the same time, the computing and memory resources of a mobile phone remain limited by the power consumption of the phone.

The phone communication with the core network passes through the base station. This feature has led to the idea of running the application on an external server, by offloading parts of the application to servers or to base stations, where the application is executed by virtual machines. In this way is created a cloud assisting the execution of a mobile application.

Disconnecting application offloading to base stations (eNB in LTE or Access Point in 802.11 and WiFi) from user mobility management creates serious connectivity or delay problems, such that for the user the mobility is not "seamless". The offloaded application may cease to receive input data or the user may not receive the output results.

The work leading to this invention has received partial funding from the European Union Seventh Framework Programme (FP7/2007-2013) under grant agreement n° 318784.

SUMMARY

An embodiment of the present invention provides a method for mobile computing, which includes configuring a group of two or more base stations in a vicinity of a user equipment (UE) in a cellular communication network to serve as a femtocloud in support of application programs running on the UE. A femtocloud control program runs on a platform associated with the network. In response to a request from the UE, an application program is offloaded from the UE for execution by one or more of the base stations in the femtocloud under control of the femtocloud control program. Upon handing over radio communication with the UE from a first base station to a second base station, the execution of the offloaded application is handed over among the base stations.

Handing over the execution may include deciding, by the femtocloud control program, to which of the base stations in the group to hand over the application program.

Typically, offloading the application program includes running the application program on one or more virtual machines run by the one or more of the base stations.

In some embodiments, offloading the application program includes selecting, by the femtocloud control program, the one or more of the base stations that are to execute the application program. Typically, selecting the one or more of the base stations includes choosing the one or more of the base stations based on availability status of computing resources, memory resources, and radio resources among the base stations in the femtocloud. Alternatively or additionally, selecting the one or more of the base stations includes choosing the one or more of the base stations responsively to a level of UE energy consumption in communication associated with the execution between the UE and the one or more of the base stations to which the application program is offloaded or offloaded application execution latency or user-perceived throughput.

In one embodiment, the application program is configured to compute a MIMO-related radio parameter, which may be used in precoding of a communication stream transmitted between the group of the base stations and the UE.

In disclosed embodiments, configuring the group of the two or more base stations includes selecting the two or more base stations from a neighboring or a serving set of the UE, wherein the UE is in communication over the air with at least one of the base stations in the group. Typically, handing over the execution includes suspending execution of the application program on the one or more of the base stations during a handover of the radio communication, and configuring the group includes updating the group of the base stations after the handover.

In some embodiments, configuring the group includes incorporating an external computing platform in the femtocloud, wherein the external computing platform may be located in a base station outside the serving set of the UE.

There is also provided, in accordance with an embodiment of the present invention, a method for mobile computing, which includes communicating between one or more base stations and a UE using a predefined air protocol, and integrating in the air protocol control and data messages used in offloading execution of an application program from the UE to one of the base stations.

Integrating the control and data messages may include dedicating a radio bearer to transport of at least one of the control messages and data messages that are used in the offloading. Additionally or alternatively, integrating the control and data messages includes creating a logical channel, having a dedicated identifier, for carrying at least one of the control messages and data messages that are used in the offloading.

There is additionally provided, in accordance with an embodiment of the present invention, a wireless base station, including a radio interface, configured for communicating over a cellular communication network with user equipment (UE), and a communication interface, configured for exchange of messages with other base stations in the cellular communication network. A processor is configured run a femtocloud control program, which causes the processor to form a group of two or more base stations in a vicinity of a user equipment (UE) in the cellular communication network to serve as a femtocloud in support of application programs running on the UE, and in response to a request from the UE, to hand over offload of an application program from the UE for execution by one or more of the base stations in the femtocloud under control of the femtocloud control program.

There is additionally provided, in accordance with an embodiment of the present invention, a wireless device, including a radio interface, configured for communicating over a cellular network with base stations in the cellular network. A processor is configured to execute an application program while offloading a part of the application program for execution by a group of the base stations that are configured to operate as a femtocloud, to support a handover of the wireless device between the base stations, to stop execution of the offloaded application program during the handover, and to resume the execution when the handover has been completed.

BRIEF DESCRIPTION OF THE DRAWINGS

The drawings do not represent an exhaustive representation of the possible embodiments of the invention and the invention is not limited to the arrangements presented in the drawings.

The drawings are.

DETAILED DESCRIPTION OF EMBODIMENTS

Figure 1:
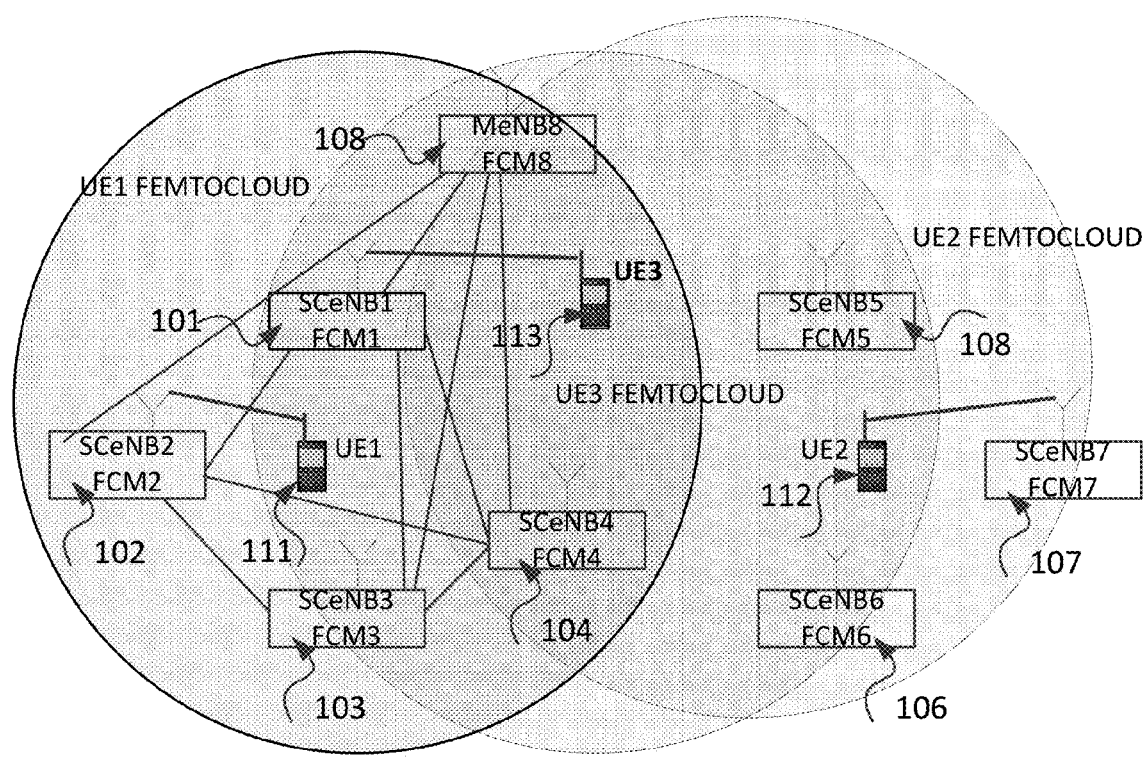
FIG. 1—Represents clusters of collaborating eNBs

Embodiments of the invention are described hereinafter in conjunction with the figures.

The following description uses terminology familiar to those skilled in wireless networks and in particular in LTE technology. This should not be considered as a limitation for the applicability of the invention to other cellular technologies.

The application offloading described herein should not be confused with mobile data offloading or cellular offloading, which target to find alternative routes to provide data to the user, for example by using WiFi. The term "mobile cloud" offering external memory resources, such as Dropbox, is also not related. Embodiments of this invention are also not related to application offloading onto an enterprise server, as presented in "ECOS: Practical Mobile Application Offloading for Enterprises". The term femtocloud, used in this invention, is not related to the cloud of femto base stations for providing broadband wireless access, but rather to small distributed clouds formed by base stations which are the target platform for application offloading. In other words, the term "femtocloud" is used in the present patent application and in the claims to denote a group of base stations that are interconnected by suitable communication links and software to enable the group of base stations to run, in addition to the provided cellular communication services, user applications offloaded from UE (User Equipment).

Overview

Radio communication includes air protocols and network level-protocols ensuring the communication of a radio transmitter belonging to the base station (eNB in LTE) and a mobile device, or user equipment (UE in LTE).

A mobile user can use applications, downloadable from remote servers to the UE, and initiate their execution on his mobile device.

The data input to these applications comes typically from the outside IP network and reaches the UE typically through the wireless network, either cellular network or WiFi network.

The application output goes mainly to the UE display; however there are cases when some data is communicated through the network to a remote site.

Running applications on the UE requires both energy and computing capabilities. The user and the wireless Operator have the common interest of reducing the mobile energy consumption and enhancing the user experience, such that the application offloading to other execution platforms may become a strong trend in the future.

An example of application common to computers and mobile devices may be the Virus and Spyware protection, using real-time scanning. Given that the air interface is secure, it is possible to implement this application in trusted infrastructures, such as base stations operated by cellular operators. The mobile user should be able to designate which entities are trusted, for example the home femto cells (HeNB in LTE) or the residential or enterprise Access Points in 802.11 or more generally the infrastructure operated by the cellular operators.

While some proposals consider that the eNB (including the full range, from femto, micro, small cells to macro, relays) and the Access Points are the best platform for offloading the application, the manager/controller of the offloading process and of the interaction with the radio network is on an external platform, sometimes integrated with elements of the core radio network, such as home gateway (HeNB-GW), S-GW (Serving GW) or MME (Mobility Management Entity).

An example of a complex application could be face recognition, when the known faces are on a remote Server and the current faces are captured by the camera embedded in the mobile phone. When the application is offloaded on the serving base station, the base station virtual machine will receive pictures from the remote Server and from the mobile phone and it will use some of its computing resources, such as memory and processor(s), to execute the face recognition program. The result may be sent back to the mobile phone, as pictures of the recognized people or as names on the pictures taken by the camera.

Radio Implications of Application Downloading

Offloading the application means in fact the split of the application in modules running on UE and modules running on an external platform. In general there is a strong interaction between the two parts of the application, involving additional data communication. The speed of the additional data communication is conditioned by the availability of radio resources.

Offloading applications can impact on the energy consumption and the created interference to other radio communications.

Reducing the data throughput of other communications implies higher transmission times and by this also higher energy consumption of the affected UEs and eNBs.

Given the existing LTE standards, allowing the eNBs to communicate over the X2 interface, the serving base station becomes a centric point for the radio communication and inter-cell interference coordination.

Availability of Computing and Memory Resources

The execution of computer programs on remote platforms implies the virtualization of the computing and memory resources, as the program runs on the same processor together with many other programs. It is considered that the program runs on a "virtual machine" using "virtual memory" resources, which can be in fact hard disk, RAM or flash memory media.

While the simple approach is the offloading of the application on the eNB serving the UE, when considering cost-sensitive small eNBs, such as femto eNBs paid for by the user, there may be significant limitations in the availability of computing and memory resources.

To resolve this situation it is desirable that the offload of the application will use resources, i.e. virtual computing machine and virtual memory, on one or more other eNBs in the collaborating set or an external platform, which can be just a computing platform or an eNB to which the UE does not have handover relations. It is preferable that such eNBs will have a high backhaul throughput, low delay and low packet loss. An alternative can be Over The Air (OTA)

communication between the base station running the application and the potential serving eNBs of the UE.

This implies that the serving eNB will contact first other eNBs and, if no resources are found, will look for external platforms for the application offload. All this process involves interaction between local resource management entities (FemtoCloud Manager) placed in the Base Station (FCM-BS) and similar entities placed in other eNBs or within external platforms.

We note that a similar action can be carried out also by the FCM-UE (FemtoCloud Manager within UE), the user being the most interested player in offloading applications, however this will necessitate many interactions such that this solution may be less attractive.

Offloading of Intense-Computing Radio Routines

MIMO systems require intensive computing algorithms for feedback to the transmitter site, such as precoding at the eNB transmitter. For enabling the precoding, the UE transmits the Precoding Matrix Indicator (PMI) and the Rank Indicator (RI), as defined in 3GPP TS 36.211 V11.1.0 (2012-12) and 3GPP TS 36.213 V11.1.0 (2012-12). Today the computations are done with low accuracy, due to reasons such as the size of the transmitted information from UE to eNB and also due to the limited computation resources at the UE. The complexity of these computations is dependent on the number of receive and transmit antennas.

In future, due to the trend of increasing the number of antennas, including also the massive MIMO (Multiple Input Multiple Output) approach, it may become attractive to offload these computations from UE to the serving eNB. This will increase the data rate of the communication between eNB and UE, but at the same time the improvement of the wireless deployment capacity obtainable by these techniques may justify the offload approach.

The offload approach for radio-related applications may change the way in which the feedback is provided; for the above example the index of the codebook may be replaced by a representation of the channel coefficients. The assessment of the channel coefficients by the UE will become more and more precise, given the new techniques which reduce the interference of the reference signals or use network information for improving the assessment.

Other offload possibilities are related to CoMP (Cooperative Multi-Point techniques), which is also computation intensive.

UE Role in Application and Radio Computations Offloading

Below are a number of elements which are relevant for the UE-centric role in complex applications and radio environments:

Radio neighborhood assessment, relevant for hand-over and interference avoidance;

Application complexity, the application being designed for UE;

Energy (battery) availability on UE;

User requirement for reduced delay of execution;

UE mobility tendency, based on the handover history;

UE classification of the neighbor eNBs as targets for handover.

Given the complexity of UE interactions, it is natural to consider an increased management role of the UE in the offloading process, by introducing in the system architecture the FCM-UE and by giving the UE an important role in the offloading system architecture.

The femtocloud system manager, given the strong interaction with the FCM-BS and other FCM-BSs, should be located in the serving eNB base station instead of being located in a more centralized way, outside of the eNB. The serving eNB is that base station providing access to mobile user radio services.

Solution Description

In continuation we use the LTE technology for exemplification, but this should not be considered as a limitation; the other cellular technologies or WLAN (Wireless LAN) technologies are also relevant.

The distributed FCM approach is based on small clusters, each cluster containing a number of cooperating eNBs. The cooperating eNBs can range from SCeNBs (Small Cell eNB), including femtos, up to relays and Macro base stations.

Each eNB includes a FCM-BS, which communicates with its counterpart in the UE (FCM-UE) and also with the other FCM-BSs in the cooperative cluster. The control of the femtocloud serving a given UE can reside either in the eNB or in the UE; in the latter case the UE can delegate some of its functions to the FCM-BS in the serving eNB.

One eNB may belong to several clusters, based on the UE radio neighbor list. Using the UE radio neighborhood means in general that UE can execute handovers and connect to those base stations. In most cases it will be possible to conduct over the air communication between these eNBs.

A more general way to define the radio neighborhood is the possibility of handover of an UE from one eNB to another one.

FIG. 1 illustrates this approach. UE1-111 is served by SCeNB2-102 (Small Cell eNB), but its coverage area allows also the connection with SCeNB1-101, SCeNB3-103, SCeNB4-104 and the macro base station MeNB8-108 which are part of its femtocloud. The same SCeNB1-101, SCeNB3-103, SCeNB4-104 and MeNB8-108 and in addition SCeNB5-108 and SCeNB6-106 are part of the UE3-113 femtocloud, UE3-113 being served by SCeNB1-101. SCeNB7 belongs only to the UE2-112 femtocloud.

The list of neighbor eNBs as seen by the UE or provisioned by the management system may dynamically change.

It is possible to consider that the femtocloud serving an UE moves with the UE, as typically the NBs constituting the femtocloud have neighborhood radio relations with the UE. After each handover it is expected that the list of neighbor eNB will be updated, because due to the new UE position more eNBs could be potential handover candidates.

The new protocol managing the small cell cloud, including the operation of the virtual machines, is named herein Z-interface or Z-protocol, and may have different parts such as Z-U (user data part) and Z-C (control part). While the Z-C interface runs between the FCMs within the scope of VM resource and mobility management of the offloaded application, the Z-U interface transports user data between VMs located in the UE, eNB and external platforms.

The possibility of UE hand-over eliminates the need for a dedicated GW having the role to switch at least a part of the application traffic to the selected VM.

The VM placement in a trusted Serving eNB can also resolve the problems related to the secure communication and the additional traffic, packet drops and delays due to the remote placement of such a central gateway.

Intra-System Communication

The communication between the FCM-UE and the FCM-BS using the new Z-protocol takes place over the radio Uu interface. The communication of a FCM-BS with another FCM-BS or with an external platform, also based on the Z-protocol, takes place over wired backhaul or Over the Air (OTA). The messages of the new Z-protocol should be identified by a specific protocol/port number or other identifier.

The criteria for selecting the over the air communication between eNBs is related to the capacity of the uplink eNB backhaul and QoS parameters, such as latency, packet loss and jitter. For example, DSL backhaul has uplink capacities between 0.25-2 Mb/s, which may create traffic congestion and high latency, precluding successful application offloading. In addition, the Router at the SP (Service Provider) location can drop packets, in case of congestion.

In case of an under-performing wired backhaul the inter-eNB connection should be Over The Air (OTA).

Figure 2:
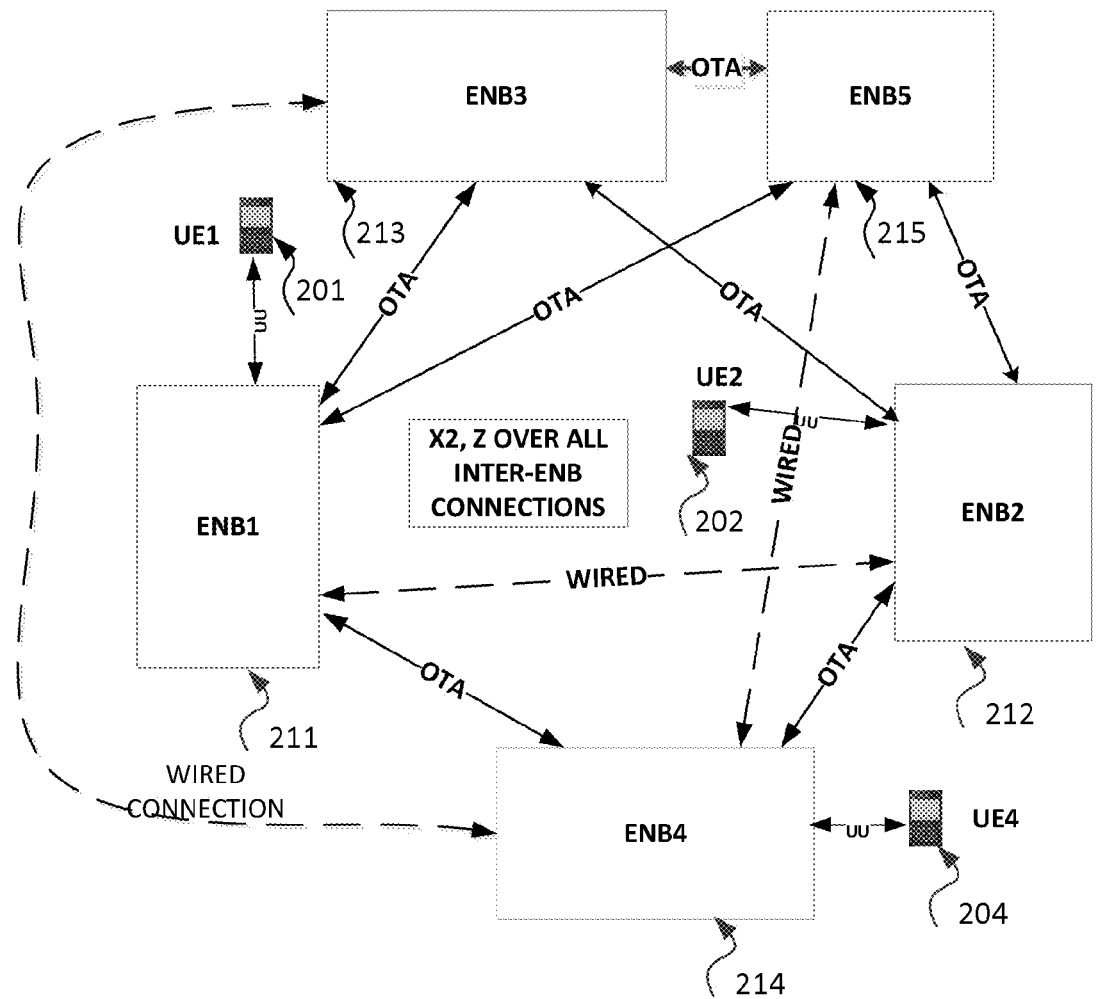
FIG. 2—Represents combined wired and OTA MP-MP eNB communication

FIG. 2 shows the eNB3-213 to eNB4-214, eNB5-215 to eNB4-214 and eNB1-211 to eNB2-212 connection over a wired backhaul and OTA connections with and between other eNBs (eNB1-211 to eNB3-213, eNB4-214, eNB5-215; eNB2-212 to eNB3-213, eNB4-214, eNB5-215, eNB3-213 to eNB5-215).

FIG. 2 shows X2 (eNB to eNB) and Z protocols communicating over the air (OTA). In such a case the packets forwarded over the air may carry special identification.

The regular UEs (UE1-201, UE2-202, UE4-204) communicate with the eNB over the Uu interface.

UE Internal Structure

A conventional UE comprises blocks such as radio, modem, processor, memory, user interfaces (display, microphone, speakers, etc.) and communication interfaces (USB, Ethernet, Wi-Fi, Bluetooth, etc). The processor uses associated memory (may be different memory types, such as flash and RAM).

Applications run over the resources of the processor and memory. Separate resources are reserved or allocated during run time for the execution of each concurrent application.

Figure 3:
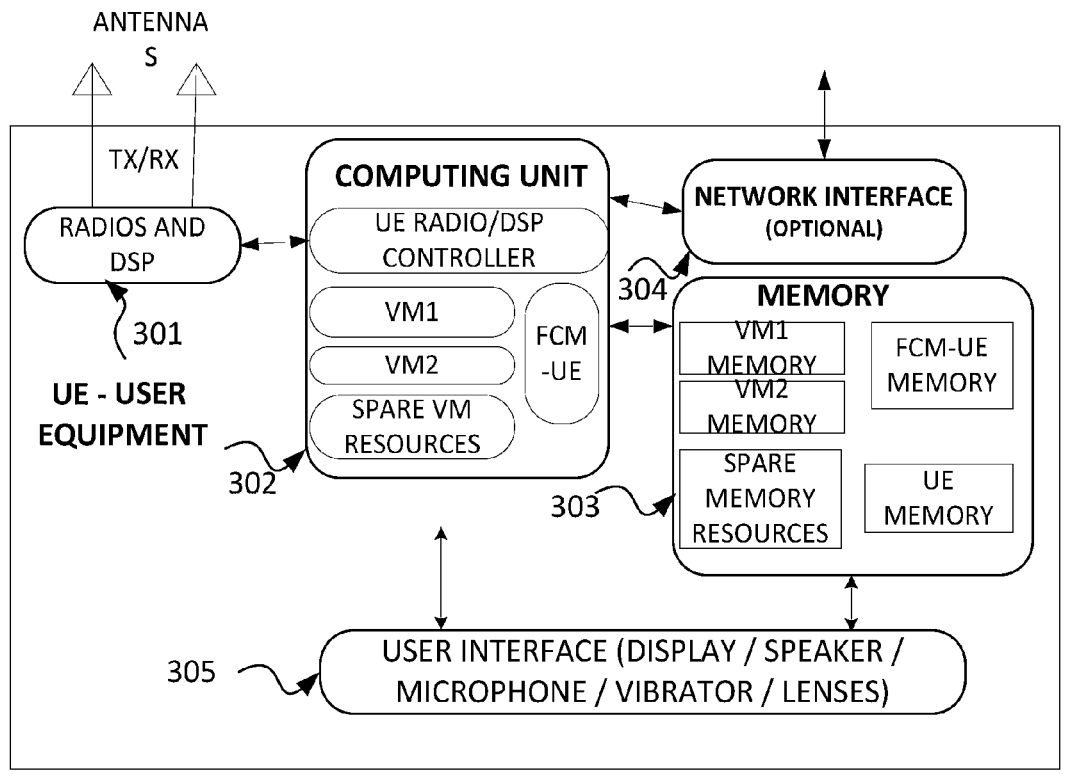
FIG. 3—Represents a cloud-enabled UE

FIG. 3 shows the UE internal structure according to an embodiment of this invention, comprising the Computing Unit 302, the Memory block 303, the Wireless Interface 301 (DSP, radios) for communication with the eNB and a Network Interface 304. In addition, the UE may include the human user interfaces 305, such as Display, Speaker, Microphone, Lenses or Machine-type interfaces, for example reading Sensors or commanding Actuators.

The computing unit(s) includes the UE radio and DSP controller (radio machine) and a number of virtual machines (VM) on which run the applications. The computing resources for running an application can be fixed or dynamically allocated. The term "Virtual Machine" is used for both dynamically and fixed allocation of resources for running user applications or radio/DSP-related controls and algorithms.

The un-used computing resources within the Computing Unit-303 are indicated as "spare VM resources".

The UE's Computing Unit includes computation resources for a FCM-UE femtocloud manager whose functionality is indicated below. The memory block provides memory resources for the different modules of the Computing Unit. In general it can be considered that the DSP/radio control machine, each virtual machine and the FCM-UE have their own memory resources, reserved or assigned on demand.

If there are not enough computing and memory resources for running a new application, the user will be in general notified.

FCM-UE Functionality

The minimum functionality of the FCM-UE is:

Create or modify over the Uu air interface communication channels, for the new Z-Interface, with neighbor BSs;

Manage the internal UE available computing and memory resources;

Gather the internal UE available radio parameters, for each eNB candidate for handover and each possible frequency channel. Such parameters are RSSI (Radio Signal Strength Indication), RSRP (Reference Signal Received Power), RSRQ (Reference Signal Received Quality), on each possible operating frequency channel in each frequency band. Additional information may include the CSI (Channel State Information) including CQI (Channel Quality Indicator) and RI (Range Indicator).

Gather the battery charging status;

Gather the hand-over history, as an indicator of its mobility behavior;

Tentatively decide, based on the above internal information, if it is beneficial to offload an application; the application offload decision should take into account that at relatively short intervals the intermediate results should be made available to UE, for avoiding information loss. This creates additional traffic which will be a burden for the UE energy consumption;

Communicate to the serving FCM-BS (in case that it exists) the gathered parameters and the tentatively offload decision;

During application offloading, check the quality of the results from the point of view of user satisfaction and update the FCM-BS; performance metrics can be the user-perceived delay, user-perceived throughput, battery consumption, etc.

If the application is finally offloaded, re-assess from time to time if it is preferred to continue the offload as initially defined, to change the offload parameters or to resume the local execution of the application.

Check from time to time if the executing eNB executes the offloaded part of the application appropriately.

In case of UE-initiated handover, coordinate with the internal UE mobility management and with the FCM-BS the unified radio and offload handover process.

In a more extended functionality, the FCM-UE can undertake part of the tasks executed by the FCM-BS.

eNB Internal Structure

Figure 4:
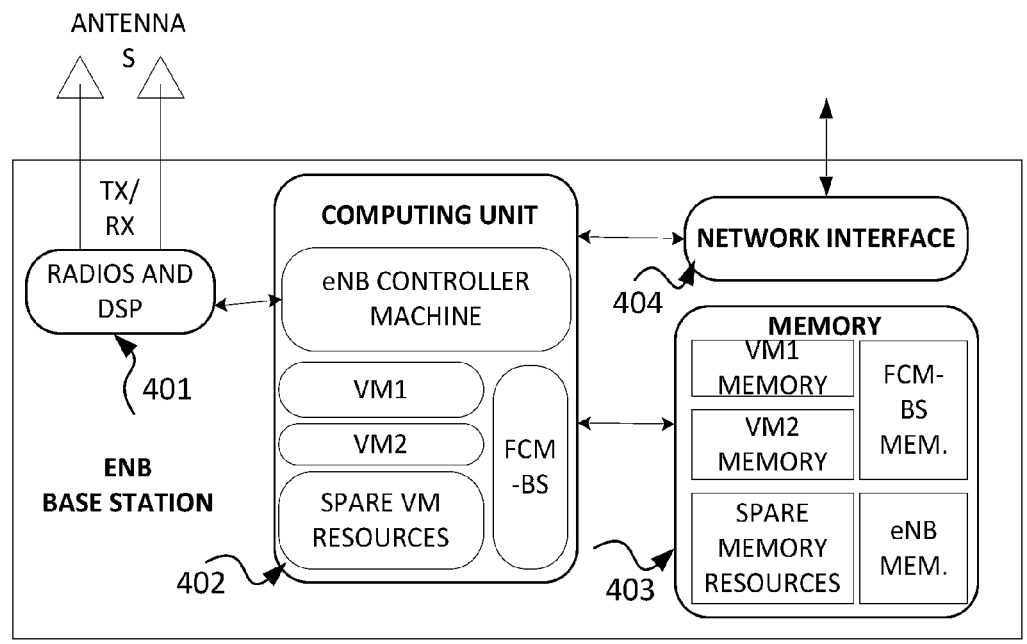
FIG. 4—Represents a cloud-enabled eNB

An eNB according to an embodiment of this invention (FIG. 4) comprises a Computing Unit 402, a Memory block 403, the Wireless Interface 401 and the External Communication Interface 404 connecting the eNB to the network.

The Computing Unit can use one or more processors, while the Memory block can use Flash memories and RAM memories.

The Computing Unit includes the eNB radio control machine and a number of virtual machines (VM) on which run the offloaded applications.

The un-used computing resources are indicated as "spare VM resources".

The eNB's Computing Unit includes a FCM-BS femtocloud manager whose functionality is indicated below.

The Memory block provides memory resources for the different units of the computing block. In general it can be considered that the eNB machine, each virtual machine and the FCM-BS have their own memory resources, reserved or assigned at demand.

FCM-BS Functionality

The FCM-BS, controlling the offload of applications from an UE, is located in the radio serving eNB. Its main responsibilities are:

Creates and modifies communication channels for the Z-Interface with the FCM-BSs located within neighbor eNBs or an external platform, either over the wired medium or alternatively over the air;

Gets from the eNB radio control machine the neighbor eNB list for each UE;

FCM-BS gets from the VM-UE or the application itself the required VM and memory resources for offloading an application;

FCM-BS communicates, possibly at VM-UE request or based on its own decision, with the collocated eNB radio control machine and the UE-specific neighbor eNBs and gets the information on the available VM and memory resources on each eNB;

FCM-BS retrieves from the serving eNB or from the FCM-UE the relevant radio parameters, some of them being listed below.

The FCM-BS communicates over the Z-C interface with the FCM-BS located in the neighbor eNBs of each UE and retrieves for each available frequency channel relevant radio parameters, such as the load indication for downlink, the radio resource allocation and reservation, overload indication and high interference indication for uplink and other parameters indicated in 3GPP TS 36.423. These parameters may be also known at the local eNB by the Radio Controller, being exchanged over X2 interface. So the FCM-BS can retrieve the above information also from the collocated Radio Controller.

Other radio parameters relevant to FCM-BS are the parameters which are reported by the UE to the serving eNB, such as RSSI (Radio Signal Strength Indication), RSRP (Reference Signal Received Power), RSRQ (Reference Signal Received Quality), actual Transmission power. Additional information may include the CQI (Channel Quality Indicator) and RI (Range Indicator). The radio parameters are useful in assessing the achievable communication speeds and transmission power of the UE with a given eNB on a given frequency channel, making it possible to assess the consumed energy and the duration for a given data transmission rate.

The FCM-BS establishes whether the UE application is already available on the serving eNB and the neighbor eNBs, for avoiding special downloading efforts; in the negative case, it may preemptively download it.

The FCM-BS communicates over the Z-C interface with the FCM-BS located in the neighbor eNBs of each UE and exchanges the status of available VMs and memory resources.

FCM-BS decides whether the application offload will improve the user quality of experience (perceived delays, user throughput, longer battery operation before charging) and on which machine (belonging to the serving eNB or to another eNB or to an external platform) the application offload should be executed; the decision should take into account that at relatively short intervals the intermediate results should be made available to UE, for avoiding information loss. This creates additional traffic which will be a burden for the cooperating eNBs and also will increase the network interference levels.

One of the criteria for selecting a cooperating eNB which is NOT a candidate for the UE handover should be the availability of a good backhaul connection between the serving eNB and the collaborating eNB or, alternatively, the availability of the OTA communication between the serving eNB and the collaborating eNBs. The achievable throughput when using OTA or the wired connection should be enough for satisfying the Z-U and Z-C data rates.

Based on the offload decision, FCM-BS seizes the VM and the memory resources. If the suitable VM and memory resources are on an eNB in the neighbor list of the UE, the FCM-BS may consider the handover of the UE to that eNB;

if other UE applications are running on the serving eNB, it is advisable to evaluate all the handover implications from offload p.o.v. and also from radio p.o.v.

FCM-BS shall check from time to time that the executing eNBs work normally and assess, based on FCM-UE reports and on own measurements, the level of user satisfaction;

FCM-BS should reassess from time to time the offload status and the load of the cooperating eNBs;

When the application ended or it was exited, FCM-BS shall release the VM and memory resources;

In case of handover, the FCM-BS should apply the handover procedures and store the VM and memory context;

After the UE handover is ended, the FCM-BS should transfer the old VM and memory contexts (over the Z interface) to the new FCM which in turn will update the new VM and memory resources.

Z-Protocol Transport

The relevant messages of the Z protocol may be encapsulated within the user data or can be part of the control information transmitted over the Uu interface. In the latter case it is assumed that the Z protocol is part of the cellular radio interface.

We note that it may be difficult to base UE-eNB communication, for transmitting Z-protocol messages, on standard IP addressing, as the serving eNB and the UE are on the same port of the BS Router, and the UE is not identified by the eNB based on its IP Address, but rather based on UE Identifiers within the radio network. It is possible for an eNB to retrieve the IP address of the UE and format the high-layer messages accordingly.

An attractive possibility is to define within the cellular standards an additional Signaling Radio Bearer (for LTE see 3GPP TS 36.331 V11.1.0 (2012-09) clause 4.2.2) which can carry the Z-C and eventually Z-U protocol messages as part of the downlink and up-link Shared Data Channels. Similarly, a dedicated data radio bearer can be defined for the Z-U messages.

The advantage of defining dedicated radio bearers is that it will enable direct UE-eNB communication without necessitating the deep packet inspection associated with conventional IP addressing, which may not be implementable on existing eNB platforms.

Another possibility is to define specific logical channels between eNB and UE for Z-protocol transport.

The LTE MAC header (see 3GPP TS 36.321 V11.1.0 (2012-12) clause 6.2.1) includes a Logical Channel Identifier, such that that messages belonging to Z-protocol could be identified based on the identifier of the logical channel. By MAC header inspection it would be possible to extract, with minimum delay, the messages belonging to the Z-protocol.

Still another possibility is the encapsulation of the Z-C and Z-D messages within local IP addresses, which can be easily recognized and forwarded to the relevant SCM or VM entities.

Hand-Over

Hand-over can occur due to multiple reasons, for example changing radio conditions caused by UE movement or load balancing or just because a better signal is received from a newly-installed eNB. Another reason for hand-over, specific for this invention, may be that the available VM and memory resources are in a different eNB in the radio neighborhood.

The application shall be designed such that it can be exited or stopped upon request and the execution context can be saved. It is preferable that, if possible, during the UE hand-over the application will enter a dormant state until the handover has been completed.

The execution context means the values of all relevant execution-related parameters, as well as the memory content. This includes program address, value of loop counters, stack addresses, memory content within the relevant memory range, etc.

At the virtual machine level, the execution context may have different names, however the meaning is similar.

The application handover request may be the result of a FCM-BS decision or of a FCM-UE request.

The FCM-BS request should be transmitted to the radio controller of the serving eNB, part of the eNB Computing Unit, to perform a hand-over from the source eNB (serving eNB) to the target eNB indicated by the message from FCM-BS.

In another case, the FCM-UE may ask the FCM-BS to check the possibility of a handover. It may optionally indicate a preferred target eNB.

This request will go over the Z-C interface to the serving FCM-BS, which will control the context (including the relevant memory content) transfer to the new VM.

An alternative approach is that the serving FCM will initiate the request over Z-C interface and the FCM-UE will cause the UE to execute the hand-over.

If the target FCM-BSs sends back a response indicating plain refusal or some degree of refusal, the serving FCM-BS may try to contact another collaborating FCM-BS.

The collaborating FCM-BSs may share the status of availability of their VMs each time a change is made.

In situations in which an UE has multiple applications running on multiple VMs and the VMs are not located in the same eNB, it may be necessary to send the application data from the serving eNB to the cooperating eNB and retrieve the results provided by the application from this eNB. In such a case the data in both directions will be sent in a container over the Z-interface. This mode of operation is similar to LTE X2-interface operation in the initial handover period, but in the case of Z interface will be active for the duration of the application offload.

Figure 5:
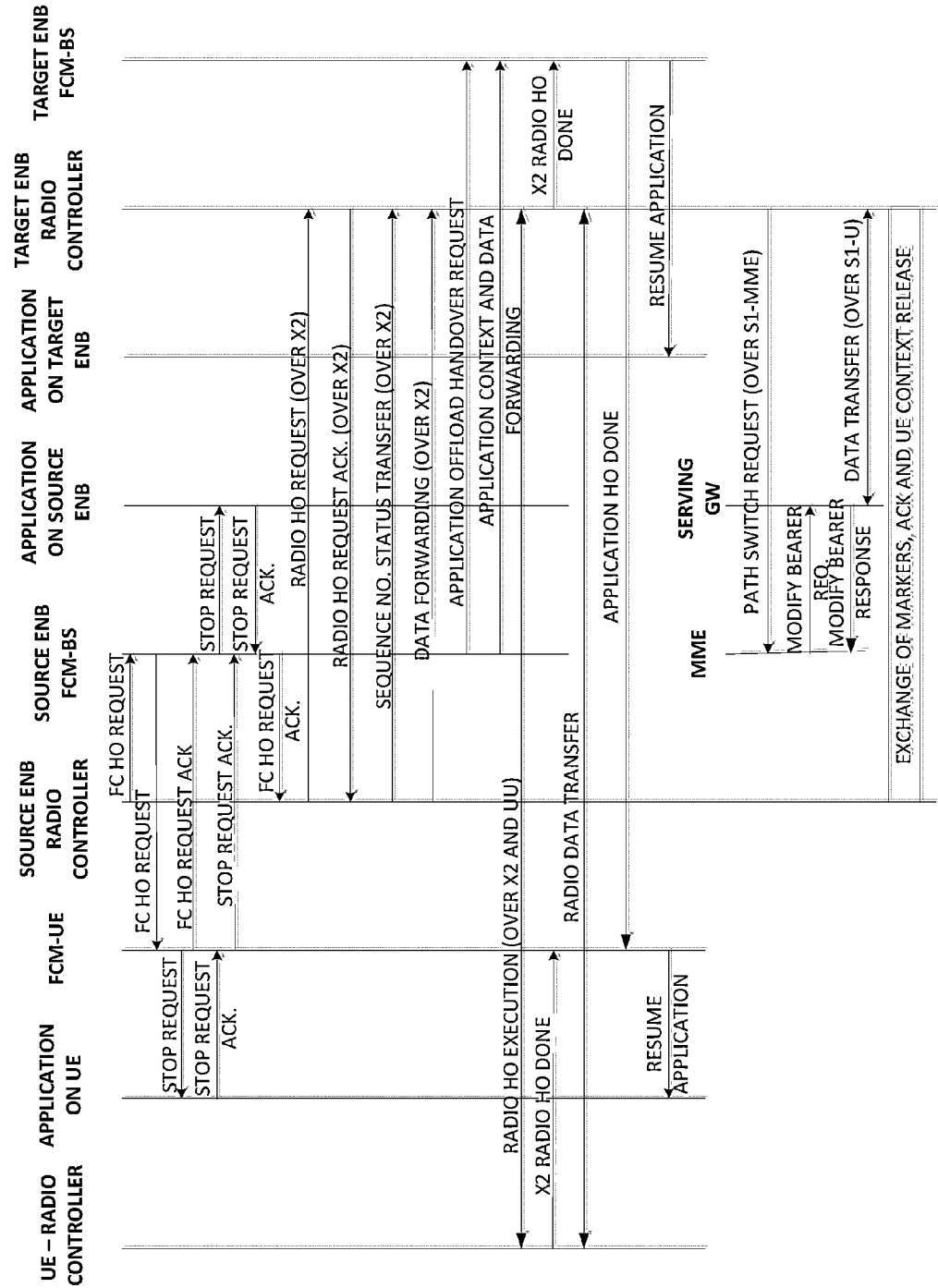
FIG. 5—Describes the steps of radio and application handover.

It is clear that there is an interaction between the radio handover and application handover. For avoiding execution errors or losing data, it is recommended to follow the process described below and in FIG. 5.

The high-level approach is:
1. FCM-BS makes sure that the handover of the VMs is possible;
2. The application offload is stopped;
3. The UE radio handover is executed and the external data arrives at the target eNB; in parallel, the handover of the context of the VM to the target eNB is executed.
4. The application offload is resumed using a VM on the target eNB.

The combined application and radio handover should follow the following steps, when the handover is initiated by UE due to radio conditions:
1. The source (serving) eNB radio controller, before initiating the radio handover (HO) process, informs the FCM-BS about its handover intention for the UEx.
2. FCM-BS makes sure that there are suitable VM and memory resources on the target eNB; if not, it looks for an alternative solution.
3. The FCM-BS communicates to FCM-UE the base station handover intention for a specific UE and the found platform (eNB) for the continuation of the offload.
4. Both FCM-BS and FCM-UE request the applications running on the eNB and UE platforms to stop.
5. Both FCM-BS and FCM-UE wait until the applications acknowledge that they stopped; FCM-UE updates FCM-BS about the stop of all offloaded UE applications.
6. FCM-BS informs the source eNB, when the execution of the VM also stopped, that the radio handover can start.
7. The source eNB requests the target eNB to start the radio handover procedures.
8. The radio handover takes place over the X2 interface
9. In parallel, the source FCM-BS announces to the target FCM-BS that the VM handover can start.
10. The application offload handover (VM context) takes place over the Z interface between the source FCM-BS and the target FC-BS.
11. When the X2 handover is ended and the UE successfully communicates upon termination with the target eNB, the radio controller of the target eNB announces the termination to the FCM-BS in the target eNB.
12. The FCM-BS in the target eNB waits for the successful termination of the application VM context and data handover.
13. The FCM-BS in the target eNB announces to the FCM-UE and the FCM-BS in the source eNB that the handover of the offloaded application has ended.
14. The FCM-BS in the target eNB and the FCM-UE announce to the application to resume execution.
15. The radio controller in the target eNB initiates, over the S1 interface, the handover process with the MME, with the result that the data from P-GW is forwarded through the S-GW to the target eNB.

If a radio handover results in cessation of application offloading, the application will resume only on the UE.

In some situations the UE may be permitted to execute the offloading procedures only if is connected to the home network or to the business network, having limited handover possibilities.

UE with Multiple Serving Cells

An UE can be served by two or more cells. The UE handover will be more robust if the VM will be placed in an eNB that is also constitutes a mobility anchor, i.e., the data relevant to a given application will always arrive at this eNB as long as the UE is connected to it. In such a case the UE will not have to hand over the context of the VM, even if other serving eNBs are changed. Such an eNB is the Master eNB in LTE Dual Connectivity.

However, there are cases when the user experience can be better if the VM is placed in another serving eNB. In such a case the data required by the application can be forwarded by the Master eNB to the better serving eNB, while the Master eNB will retain in a buffer the data exchanged (in both directions) by the application running on a VM placed in another serving eNB.

By using the above data caching, it will be possible, in case of UE handover in the coverage area of the Master eNB, to execute a faster VM handover from a serving eNB to the Master eNB.

Offloading Spectrum Policy

The offload process may involve additional traffic. In cases in which the eNB capacity is limited, the application offloading could use unlicensed or shared (free of charge) frequency bands in an opportunistic mode, i.e., the offloading will preferentially use the un-licensed/shared spectrum or will take place only if there are free channels in the unlicensed/shared spectrum.

Technologies

The description of the embodiments above refers to base stations, but other central or distributed wireless transmission entities, such as Access Points, Node B, Home Node B, etc. can also be operated in similar fashion.

As will be appreciated by those skilled in the art, the terminology used throughout the specification is mainly associated with the LTE standards. However, it should be understood that embodiments of the present invention encompass other wireless standards, such as IEEE 802.11, IEEE 802.15, IEEE 802.16, HSDPA and its evolutions and the like and both TDD and FDD duplexing modes.

The examples provided show certain ways of carrying out the invention. It is to be understood that invention is not intended to be limited to the examples disclosed herein. Rather, the invention extends to all functionally equivalent structures, methods and uses, such as are within the scope of the hereinafter claims.

The invention claimed is:

1. A method for mobile computing, comprising:
configuring a group of two or more base stations in a vicinity of a user equipment (UE) in a cellular communication network to serve as a femtocloud in support of application programs running on the UE;
running a femtocloud control program on a platform associated with the network;
in response to a request from the UE, offloading an application program from the UE for execution by one or more of the base stations in the femtocloud under control of the femtocloud control program; and
upon handing over radio communication with the UE from a first base station to a second base station, handing over the execution of the offloaded application among the base stations.

2. The method according to claim 1, wherein handing over the execution comprises deciding, by the femtocloud control program, to which of the base stations in the group to hand over the application program.

3. The method according to claim 1, where offloading the application program comprises running the application program on one or more virtual machines run by the one or more of the base stations.

4. The method according to claim 1, where offloading the application program comprises selecting, by the femtocloud control program, the one or more of the base stations that are to execute the application program.

5. The method according to claim 4, wherein selecting the one or more of the base stations comprises choosing the one or more of the base stations based on availability status of computing resources, memory resources, and radio resources among the base stations in the femtocloud.

6. The method according to claim 4, wherein selecting the one or more of the base stations comprises choosing the one or more of the base stations responsively to a level of UE energy consumption in communication associated with the execution between the UE and the one or more of the base stations to which the application program is offloaded or offloaded application execution latency or user-perceived throughput.

7. The method according to claim 1, where the application program is configured to compute a MIMO-related radio parameter.

8. The method according to claim 7, where the MIMO-related radio parameter is used in precoding of a communication stream transmitted between the group of the base stations and the UE.

9. The method according to claim 1, wherein configuring the group of the two or more base stations comprises selecting the two or more base stations from a neighboring or a serving set of the UE, wherein the UE is in communication over the air with at least one of the base stations in the group.

10. The method according to claim 9, wherein handing over the execution comprises suspending execution of the application program on the one or more of the base stations during a handover of the radio communication.

11. The method according to claim 10, wherein configuring the group comprises updating the group of the base stations after the handover.

12. The method according to claim 1, wherein configuring the group comprises incorporating an external computing platform in the femtocloud.

13. The method according to claim 12, wherein the external computing platform is located in a base station outside the serving set of the UE.

14. A wireless base station, comprising:
a radio interface, configured for communicating over a cellular communication network with user equipment (UE);
a communication interface, configured for exchange of messages with other
base stations in the cellular communication network; and
a processor, which is configured run a femtocloud control program, which causes the processor to form a group of two or more base stations in a vicinity of a user equipment (UE) in the cellular communication network to serve as a femtocloud in support of application programs running on the UE, and in response to a request from the UE, to hand over offloading of an application program from the UE for execution by one or more of the base stations in the femtocloud under control of the femtocloud control program.

15. The wireless base station according to claim 14, wherein the processor is configured to assess available computing and memory resources for offloading the application program on the base station and to communicate with other base stations in the femtocloud for gathering status information with respect to available computing and memory resources on the base stations and to cause the UE to execute a handover to a given base station responsively to the available computing and memory resources, UE radio measurements, and an expected improvement in energy consumption or execution time when executing the application program in an offloaded mode.

* * * * *